United States Patent
Shaver et al.

(10) Patent No.: US 8,867,158 B2
(45) Date of Patent: Oct. 21, 2014

(54) QUIET FIELD AND SYNCHRONIZATION FIELD DATA FORMAT

(71) Applicant: Seagate Technology LLC, Cupertino, CA (US)

(72) Inventors: Jimmie Ray Shaver, Yukon, OK (US); Barmeshwar Vikramaditya, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/842,388

(22) Filed: Mar. 15, 2013

(65) Prior Publication Data

US 2014/0268395 A1    Sep. 18, 2014

(51) Int. Cl.
*G11B 5/09*   (2006.01)
*G11B 20/12*  (2006.01)

(52) U.S. Cl.
CPC .................................. *G11B 20/1252* (2013.01)
USPC .............................................. 360/48; 360/51

(58) Field of Classification Search
None
See application file for complete search history.

(56) References Cited

U.S. PATENT DOCUMENTS

| | | | |
|---|---|---|---|
| 6,594,096 | B2 | 7/2003 | Burns et al. |
| 6,611,391 | B1 | 8/2003 | Murphy et al. |
| 7,679,852 | B2 | 3/2010 | Shaver et al. |
| 7,889,450 | B2 | 2/2011 | Vikramaditya et al. |
| 7,969,676 | B2 | 6/2011 | Buch et al. |
| 8,085,486 | B2 | 12/2011 | Lam |
| 2010/0118428 | A1 | 5/2010 | Buch et al. |
| 2010/0118429 | A1 | 5/2010 | Vikramaditya et al. |
| 2010/0161917 | A1 | 6/2010 | Reddy |
| 2012/0082015 | A1* | 4/2012 | Grobis et al. ............. 369/13.24 |

\* cited by examiner

*Primary Examiner* — Regina N Holder
(74) *Attorney, Agent, or Firm* — HolzerIPLaw, PC

(57) ABSTRACT

Data format that allows for format-efficient data storage, particularly on bit-patterned media. The data format allows for variations in the data storage device, such as reader-to-writer gap variations. A medium can also have at least a pair of a synchronization field and a quiet field with a length greater than a length of the synchronization field. These can be implemented in a bit patterned media system.

24 Claims, 5 Drawing Sheets

QUIET FIELD AND SYNCHRONIZATION FIELD DATA FORMAT

SUMMARY

The detailed description describes a data format with quiet fields and synchronization fields paired with the quiet fields and aligned on symbol boundaries. The detailed description also describes a medium with at least a pair of a synchronization field and a quiet field with a length greater than a length of the synchronization field. A track can have data wedges that include respective first spaces for overhead and respective second spaces for data, each of the first spaces are a same size and each of the second spaces are a same size.

DETAILED DESCRIPTION

Figure 1:
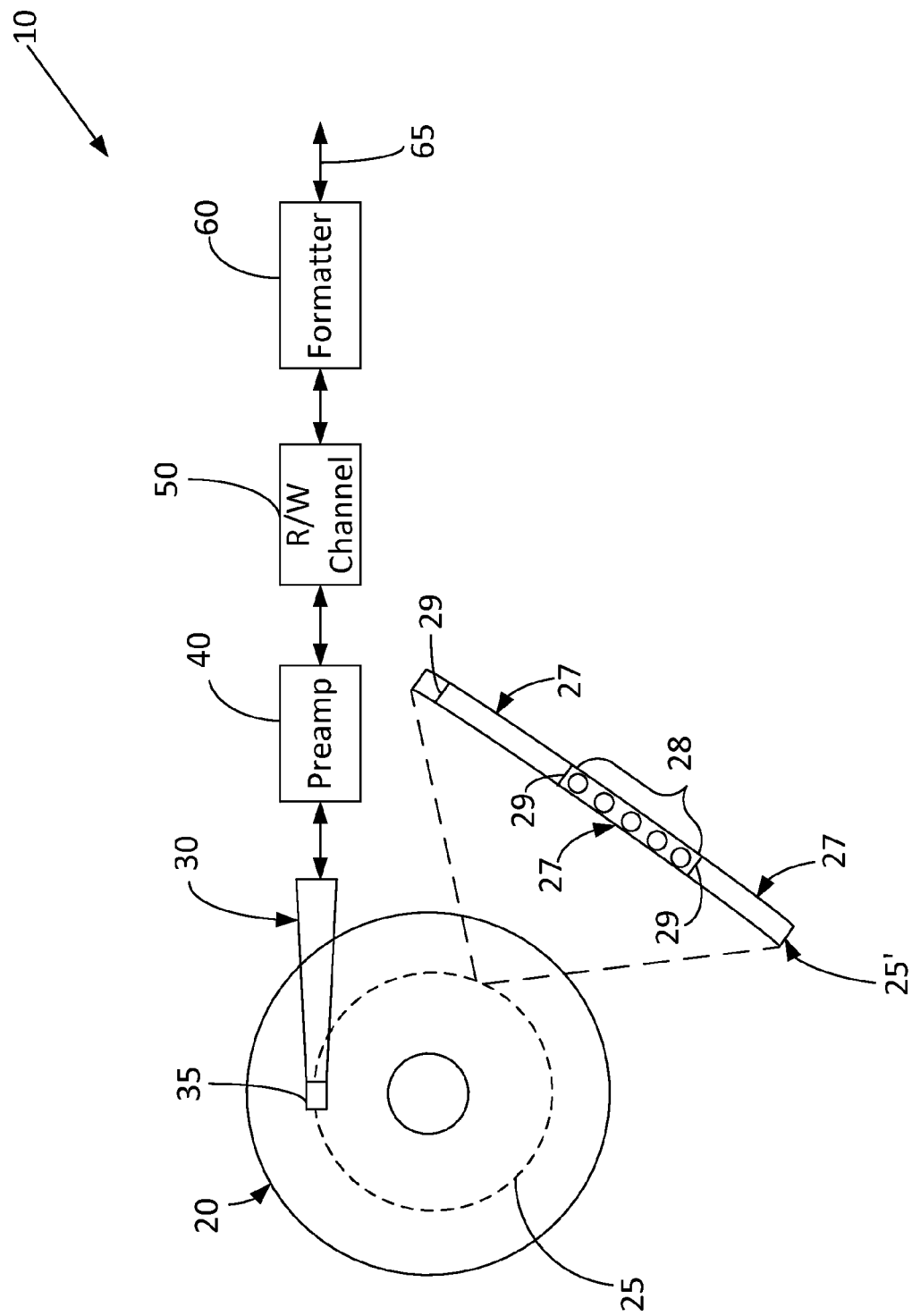
FIG. 1 illustrates a device that uses bit-patterned media.

The capacity of a storage device, such as a disc drive, can be increased by using bit-patterned media (BPM). Such a disc drive is shown in FIG. 1. Disc drive 10 includes BPM 20 that stores data on tracks, one shown as track 25. In some embodiments BPM 20 may also be a heat assisted magnetic recording medium that includes features to enable that technology. Data on track 25 is accessed by a transducing head 35 on an actuator arm 30, a preamplifier 40, a channel 50 and a formatter 60.

BPM 20 is constructed with isolated areas (referred to as "dots" or "islands") of the magnetic material of BPM 20, each dot intended to contain one bit of data or more than one bit of data in a multilevel embodiment. To illustrate, track portion 25' is shown that includes data wedges 27 and servo sectors 29. Data wedges 27 include dots 28 that are used for storing data and overhead information. Each dot is separated from its adjacent dots by regions of non-magnetic material. There can be thousands, millions or more of dots for each data wedge.

Servo sectors 29 are used by components of disc drive 10 to obtain position information such as the number of the track that transducing head 35 is tracking, the circumferential position of transducing head 35 relative to that track, fine positioning information that is used to keep transducing head 35 on that track, etc.

To write data to BPM 20, formatter 60 receives data on bus 65. The data can be from a system or host using disc drive 10, or can originate from within disc drive 10. Formatter 60 formats the data for each data wedge 27, then sends the formatted data to channel 50. Channel 50 encodes the formatted data for storage on BPM 20. In the meantime, channel 50 is also synchronized with the dots on a BPM track so that channel 50 can timely provide the encoded, formatted data to preamplifier 40. Preamplifier 40 transmits the signal representing the encoded, formatted data to transducing head 35. A writer (not shown) of transducing head 35 then interacts with a BPM track to write the encoded, formatted data. Reading of data from a BPM track is processed in reverse of the manner described.

BPM 20 also contains embedded timing burst patterns (not shown) that are formatted into the dots 28 of data wedges 27 at preferred regular timing intervals. These embedded timing burst patterns are referred to as iPLL (interspersed phase-locked loop) fields or "P fields." The P fields can have a different physical dot pattern (e.g., frequency) than the dots for the remaining part of the data wedge. Circuitry in the disc drive, particularly channel 50, uses the P fields to obtain phase and frequency clock synchronization with the dots 28 on BPM 20. The timing interval between the P fields is based on a magnitude and a bandwidth of tolerable timing disturbances between channel 50 and BPM 20. Specifically, the frequency tolerance and interval between P fields is chosen to ensure that under sustained operating conditions an accumulated phase error stays within limits for reliable writing.

Figure 2A:
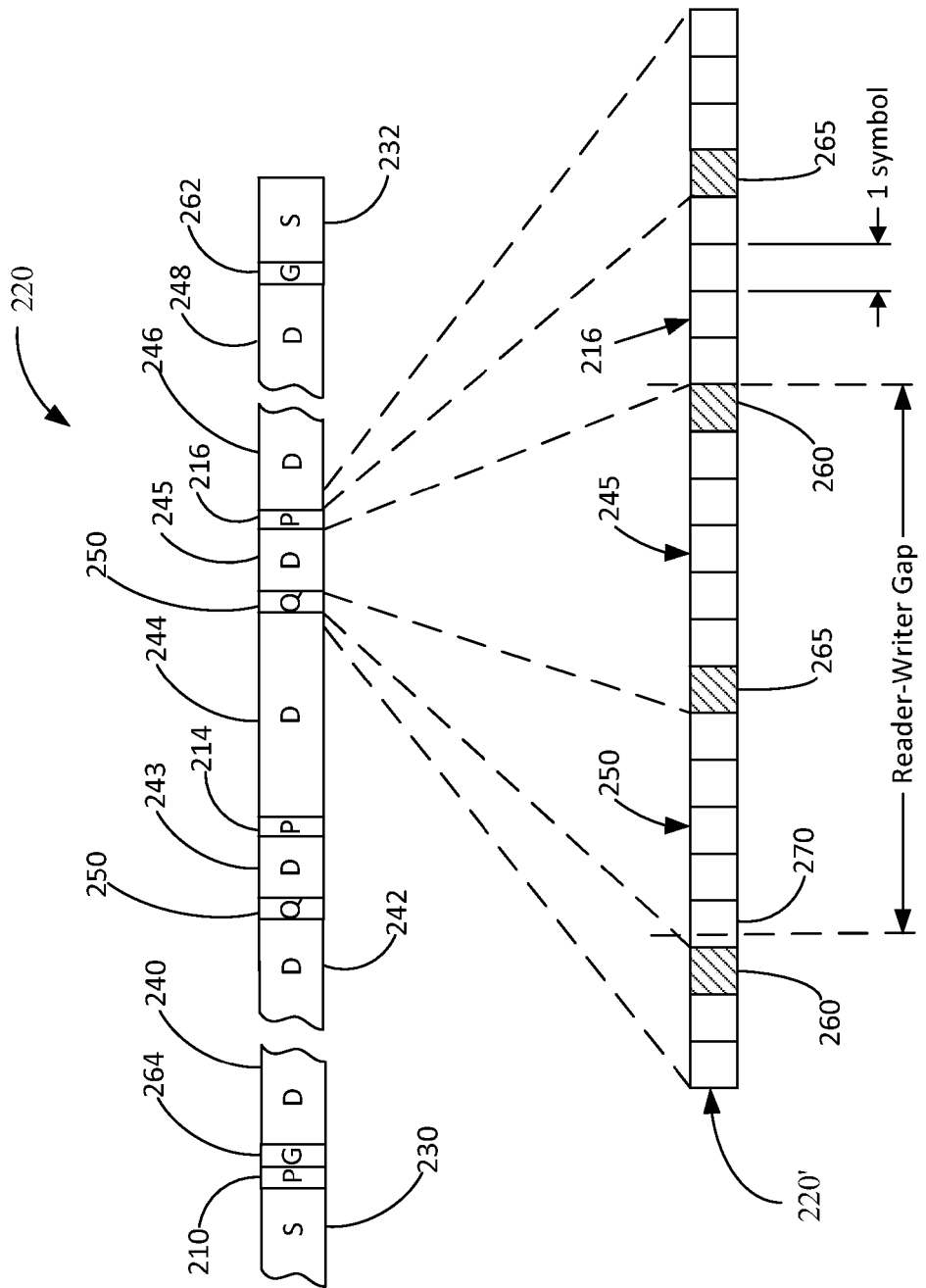
FIGS. 2a and 2b illustrate a data format for a data wedge.

FIG. 2a shows a single BPM data wedge between two servo fields containing multiple P fields. P fields 210, 214, 216 break data wedge 220 between servo fields 30, 32 into multiple data regions 240, 242, 243, 244, 245, 246, 248. During write operations the P fields 210, 214, 216 are read to obtain timing phase information to feed back into the data phase-locked loop (PLL) of the channel. While the reader (not shown) of the transducing head is reading the P fields 210, 214, 216, the writer is "quiet." The writer is either not energized or writing a DC field to avoid inducing noise into the reader or read signal. To facilitate this, quiet fields 50, or "Q fields," are formatted onto the media prior to each P field 214, 216 since the writer trails the reader in the transducing head. The precise location of each Q field 50 relative to its associated P field can vary from head to head and from track to track due to the variations in the effective reader-writer gap. Since no data is written in the date wedge 220 prior to P field 210, no associated Q field is used. Each of the data regions 243, 245 between the Q and P fields are referred to as a "runt data regions."

The placement of each Q field can be determined during manufacturing, and saved for each track and potentially each zone. During that time all the transducing heads of a disc drive are characterized, particularly the reader-writer gap for each transducing head across all zones of each surface of each BPM in the disc drive. A zone can consist of multiple tracks that have characteristics similar enough that they can all be treated the same for purposes of accessing data stored on them. For example, a zone can have multiple tracks that have the same data wedge format and the same data frequency.

Figure 2B:
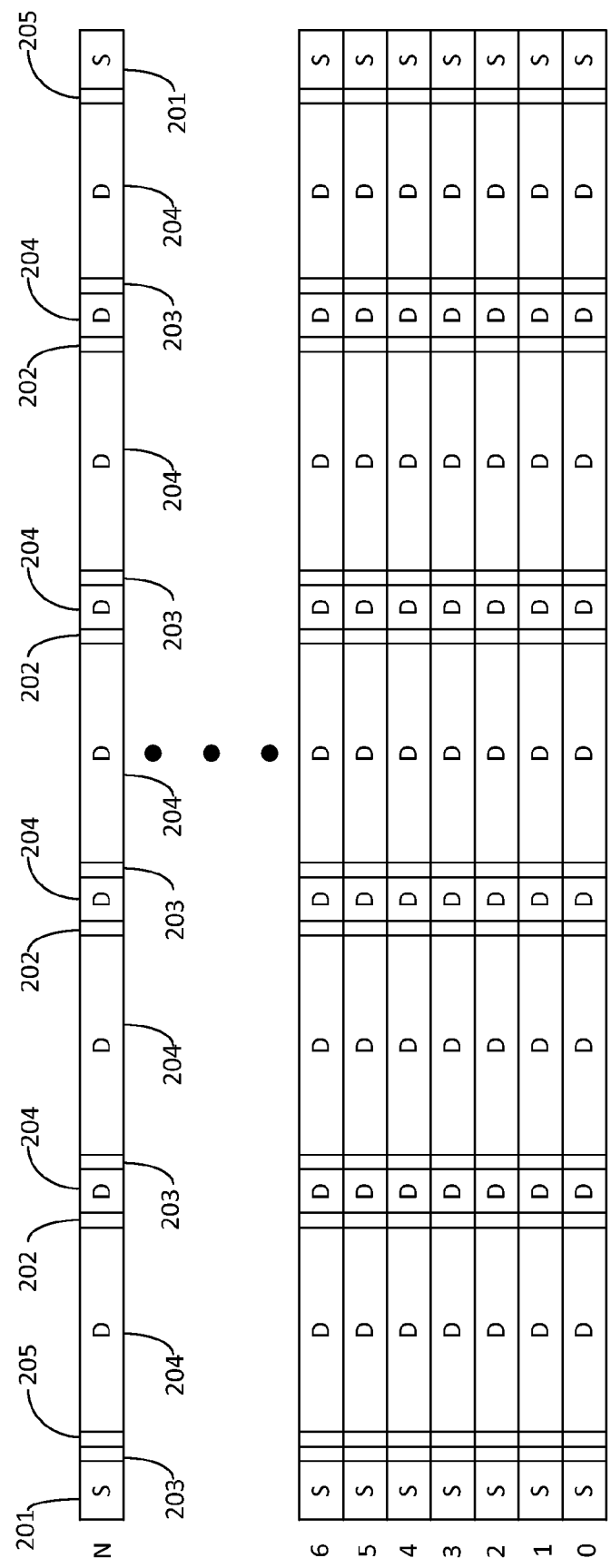
Figure 4:
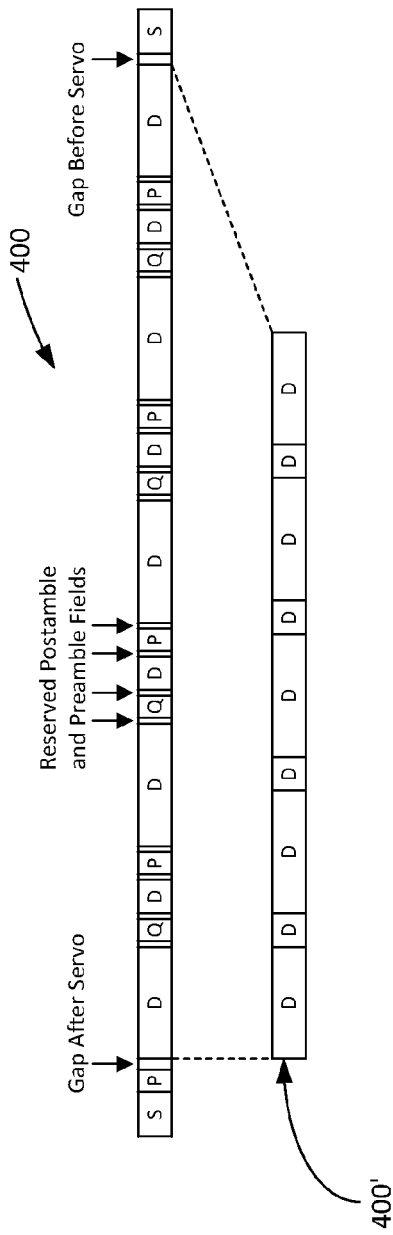
FIG. 4 illustrates data regions without certain overhead.

FIG. 2b illustrates a zone that includes radially-aligned data wedges of tracks 0-N. Servo sectors 201 bound Q and P fields 202, 203, data regions 204, and gaps 205 before and after the servo sectors. As shown, Q and P fields are radially aligned within the zone. The Q and P fields can be individually and collectively considered as "transducing head overhead."

Tracks 0-N constitute a zone on a surface of the BPM. As such, tracks 0-N have similar characteristics so that the disc drive firmware can easily control access to them. For example, the data wedges have the same number of dots between servo sectors 201.

Turning back to FIG. 2a, illustrated is a larger scale data wedge portion 220' of the data wedge 220 showing the relative positions for Q field 250 and P field 216. Data wedge portion 220' is composed of several defined areas on the media called "symbols" that are shown as squares in data wedge portion 220'. Each symbol is twelve bits (dots) long, for example.

P fields are preferably aligned to symbol boundaries, and can include pad bits in the beginning and/or end symbols to facilitate the symbol alignment. P fields can also include a synchronization pattern. Preferably Q field 250 is sized at least one symbol larger than its associated P field 216 since the reader-writer gap may not be an integer number of symbols. To illustrate, the reader-writer gap is shown to extend from the first symbol of P field 216, back to within symbol 270 immediately after postamble 260. Since P field 216 is four symbols long, Q field 250 includes symbol 270 and the immediately following four symbols. Also, the effective reader-writer gap varies with the transducing head skew angle, so the position of the Q field relative to the P field is dependent on the radial position of the data track within the zone. The size of the Q fields is preferred constant across such zone.

The disc drive firmware can determine the size of the runt data region 245 between Q field 250 and P field 216, based on the reader-writer gap of the corresponding transducing head at the corresponding data track. In FIG. 2a the number of symbols between the beginnings of the Q and P fields is twelve, so twelve minus the five symbols of Q field 250 leaves seven symbols for runt data region 245, including preamble 265 and postamble 260.

Preamble and postamble fields 265, 260 shown in FIG. 2a can be used immediately before and after every area of contiguous data to support the decoder function in the channel that recovers the actual bits from the encoded bits on the BPM. These fields preferably are at one symbol each. The preamble and postamble fields do not have to be the same size, but each are the same size for the entire track and potentially a zone.

Due to the unipolar nature of the P field media pattern (e.g., ++00) the signal read from the P field may not be sufficient to serve as valid preamble or postamble data for the decoder of the channel. Therefore, a postamble field is used before every P field, and a preamble field is used after every P field for the decoder. Since the Q field can be written as a DC pattern over the BPM, it has different read-back characteristics than the P field. Therefore, the Q field may not require a postamble field or a preamble field. However, as shown in FIG. 2a, the preamble and postamble fields 265, 260 are used around both P and Q fields, and they are each one symbol long. Each preamble and postamble, if used, associated with respective Q and P fields is also part of the transducing head overhead.

During read operations the channel skips the Q field 50 and reads the P fields 210, 214, 216 of data wedge 220 to maintain the channel PLL synchronization with the BPM. Even if some of the sectors are being skipped (for example, they are not part of the requested block transfer), the channel still reads and demodulates the P fields. Note that a gap before servo 262 compensates for the reader-writer gap and write-to-read recovery time when switching from writing data to reading servo data. A gap after servo 264 may be used to support servo-recovery to data-recovery switching time and for recording special data fields, such as repeating run-out and repeating timing run-out fields, if needed.

With bit-patterned media, consideration is given to the placement of write splices on the media near Q fields and P fields. Write splices are used when the writer current is turned on or off. The duration of the write splice represents a current transient in the writer circuit that would interfere with any read operation, such as recovering a P field. In addition, preamplifiers can produce a high-frequency "degaussing" burst to the writer shortly after switching out of write mode. These degaussing bursts and current transients in the writer are preferred not to overlap any Q, P or servo field on the media since these fields should maintain their default magnetization state. Therefore, "invalid write splice" regions are defined by the formatter to prevent any portion of a write splice from overlapping a Q or P field.

Figure 3:
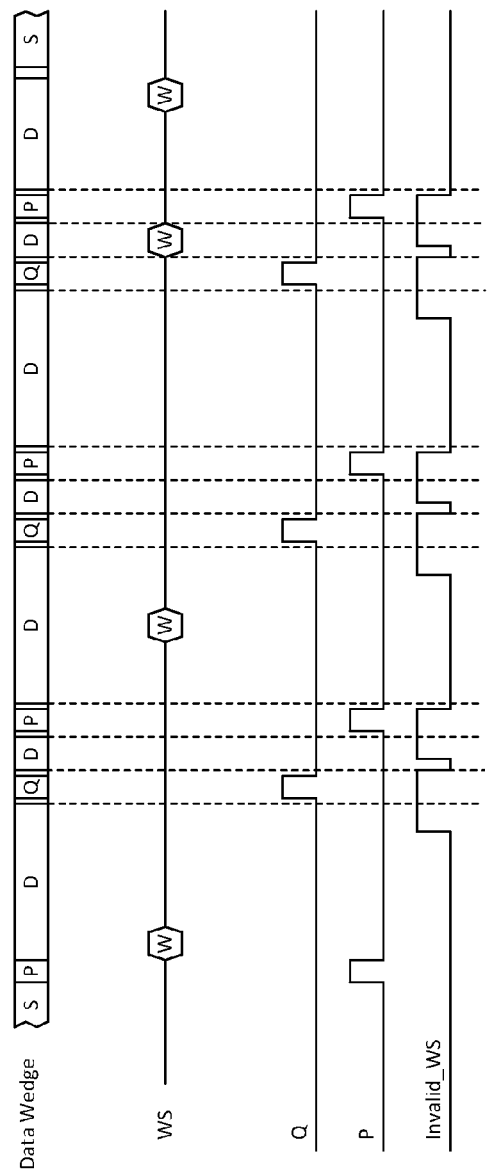
FIG. 3 is a write splice timing diagram.

The formatter timing diagram in FIG. 3 illustrates an example of a data wedge format and write splice placement. The WS (write splice) signal indicates where the formatter has determined each write splice is located in the data wedge format. The Invalid WS signal indicates every symbol position in the data wedge at which a write splice is not allowed to begin, for protection of the Q and P fields. And as shown the write splice length is short enough that it can fit in the runt data regions between the Q and P fields. The "Q" and "P" signals represent the placement of the Q and P fields as programmed in the formatter.

Taking into account the fixed symbol length of the Q and P fields, postambles, preambles and other overhead besides the data, the formatter ensures that all data tracks within a recording zone have the same physical track layout and the same sector capacity. This is so regardless of how the runt data region size between Q and P fields varies with a transducing head skew angle and the linear bit density, and regardless of any particular transducing head reader-writer gap size. This small tradeoff in format efficiency allows for significant reductions in firmware and manufacturing complexity. Here note that the symbol length of the runt data region may vary in a zone because the reader-writer gap may vary due to head skew changes over that zone. If the reader-writer gap increases so as to encroach upon the symbol preceding the Q field, that symbol will be included in the Q field. But the symbol at the other end of the Q field will be added to the adjacent runt data region. The result is that the Q fields stay the same length as well as the total number of symbols in the data regions. To further explain this result, consider FIG. 2b where the Q fields 202 would be shifted one symbol earlier in the data wedge of track N. Then the adjacent runt data region length would increase by one symbol. In this case track N can still be included in the zone with the other tracks shown.

Referring back to FIG. 1, formatter 60 models the BPM with symbol resolution, where a symbol can be defined as a unit of data transferred between formatter 60 and read channel 50 in one clock cycle. A symbol size can be 12 bits. All fields in the data wedges between servo fields preferably are defined in terms of integer numbers of symbols. These fields include Q fields, P fields, the gaps before and after the servo fields, data regions, intersector gap fields, write splice fields, preamble fields and postamble fields. Intersector gap fields are used to support the random write access of the data on the BPM. An intersector gap can include, for example, a preamble, postamble, write splice and extra symbols.

Prior to accessing data on the BPM, channel 50 and formatter 60 are programmed with overhead information for the desired track. This programmed information may also be used in whole or in part for a zone in which the track belongs. The overhead information includes whether preambles and postambles are used, the symbol size of the preambles, postambles, WS, Q field, P field, runt data regions, the location of the Q fields, and other information that may be used for data access. This information is programmed by the disc drive controller firmware into respective configuration registers (not shown).

During the reading of sector or sector fragment, channel 50 may encounter a Q field or P field, based on its internal symbol counter and its programmed Q and P field parameters. When such encounters occur, channel 50 automatically pauses its data symbol decoding before the Q field or P field, and automatically resumes its data symbol decoding after the Q field or P field. If preamble and postamble fields are enabled in channel 50 configuration registers, channel 50 also automatically pauses its data symbol decoding over preamble and postamble fields.

In write mode, while actively writing to the media, channel 50 automatically holds the write data to a predetermined (possibly programmable) DC level when the writer is over the Q fields or the P fields. Specifically, channel 50 does not transition the write current (either by changing the write data or by turning the preamplifier on or off) while the reader is over a P field. Channel 50 does not cause the preamplifier to exit write mode if the writer is over a P field or if the writer is over a P field before the write splice time expires. This also supports preamplifiers that generate a high-frequency "degaussing" burst to the writer during the write current turn-off period.

Instead of phase locked oscillator and sync fields, each data sector begins with a write splice field. Channel 50 is programmed with the size of this write splice field, which will potentially vary with recording zone, but will not vary on a given data track. Optionally, split data sectors also include a write splice field before and after the servo field, if writing through servo fields cannot be supported (for example, due to the use of repeatable run-out fields or other data fields written into in each servo field). Channel 50 automatically writes a default (possibly 2T) pattern during the write splice field when writing to the media, and will automatically skip the write splice field when reading from the media.

As described above, the BPM architecture will support preamble fields at the beginning of each contiguous run of sector data and postamble fields at the end of each contiguous run of sector data, to provide opening and closing sequences for the maximum-likelihood decoder in the channel.

Formatter 60 calculates the data format for the upcoming data wedge. To do that, either the formatter has already calculated an immediately previous data wedge format and can use that to calculate the upcoming data wedge format. Or the formatter has to catch up to understand the previous data wedge format, particularly if a data sector is split across a servo wedge. This catch up can occur when the transducing head has moved tracks.

First, the formatter understands what servo wedge, actual or logical, the transducing head is over. Next the formatter determines if the first data sector fragment of the upcoming data wedge is part of a split data sector or begins a new data sector. This determination is done by the formatter using another model of the data wedge as a contiguous group of data regions. A data format of data wedge 400 is shown between two servo wedges. Data wedge 400 includes data regions D, Q and P fields, and preamble and postamble fields. However, for purposes of this determination, the formatter discards the Q and P fields along with the associated preamble and postamble fields (the transducing head overhead), and ignores the gaps before and after the servo wedges. In this way, the formatter only considers the data regions shown as 400'. The data regions in 400' are effectively concatenated data. Note that for this concatenated data model the data regions can include all write splices, intersector gaps, and any additional preambles and postambles. The write splices, intersector gaps, and any additional preambles and postambles can be considered individually and collectively as fragment overhead. Non-overhead includes the actual data that can be considered as data symbols.

In addition, the formatter takes into account the overhead—Q and P fields, intersector gaps, preambles, postambles, write splices, gaps before and after servo—within each data wedge of a track are constant, regardless of how data sectors are interrupted by Q and P fields. Every intersector gap field on the track is the same size. Every write splice field is the same size. Every Q field is assumed to have a postamble field immediately before it and a preamble field immediately after it. (Preamble and postamble fields may not be required around the Q fields; in this case, these preamble and postamble fields will be assumed to be zero-length.) Every P field is assumed to have a preamble field immediately after it, and every P field except the first one in each data wedge is assumed to have a postamble field immediately before it. If a gap after servo (GAS) field is required (for example, to contain repeatable timing run-out information), it occurs after the first P field of every data wedge. Given all that, the data regions 400 have the same number of symbols for each data wedge of a track. That can extend to all or part of the tracks that make up a recording zone.

Using the fact that the data regions 400 have the same number of symbols for each data wedge of a track, the formatter can quickly determine the upcoming data wedge format. For example, consider that a transducing head settled on a new track. The first servo wedge it encounters is servo wedge 2. With the formatter knowing that each data sector size is X and the data regions 400' total size is Y (Y≥X), the formatter divides Y by X and then multiplies the result by the number of preceding data wedges (2 in this case). Any fraction starts the data sector fragment immediately after servo wedge 2. The formatter can then start generating data access information knowing the lengths and locations of the overhead symbols, and the symbol lengths of the data sector and data regions 400'.

This formatter model allows the quick calculation of the split configuration at the end of any data wedge, given the split configuration at the beginning of the data wedge. It also allows for the quick calculation of the impending data wedge format based on the actual or logical servo wedge zero. This model also allows for substantial use of different formatter configurations.

The description above allows for format-efficient data storage on bit-patterned media, while allowing for typical variations in the drive, such as reader-writer gap variations. The description above is applicable for systems in which the channel and the formatter are integrated as parts of the same "system on chip", or SoC. Therefore, separate read and write data buses have been used instead of a bidirectional bus with bidirectional control signals. However, there may be circumstances where a discrete, external formatter may be used to interface to an external channel. The read and write data buses can then be combined into a single bidirectional bus to reduce overall pin count.

The detailed description is illustrative only and is intended not to limit this disclosure. Variations and modifications are possible. For example, the functionality can be performed by hardware alone, or hardware under firmware control. Any of the fields do not have to be symbol aligned. The units on the interface would then be defined as something other than symbols. Bits instead of symbols can be used. Although the length of the Q field is determined by the length of the P field as described to be as short as possible to satisfy the timing recovery requirements, the Q field can be the same size as the P field depending on the resolution the interface uses. The Q field can also be greater than or equal to the length of the P field, constrained by any physical limitations of format efficiencies taken into account.

The runt data region space can be eliminated so that the entire reader-writer gap can be just Q and P fields. The Q field could run into the P field, leaving no usable media between them. However, this situation would represent a significant format efficiency loss, which is less desirable. The write splice can be any size. The interface protocol supports a wide range of write splice lengths. Smaller is better for format efficiency. The preambles and postambles can be any size. The interface protocol can support preambles and postambles longer than one symbol. The formatter implementation is simplified by assuming they can be no longer than one symbol. The preamble and/or postamble can be eliminated from the ISG. However, induced bit errors may occur. The ISG does not have to include extra symbols. Including extra symbols in the ISG helps to keep the formatter logic less complex. A symbol can be anything less than a sector in size. The symbol width is chosen to be a practical unit of data transfer and timing management for both the read channel and the formatter.

Figure 5:
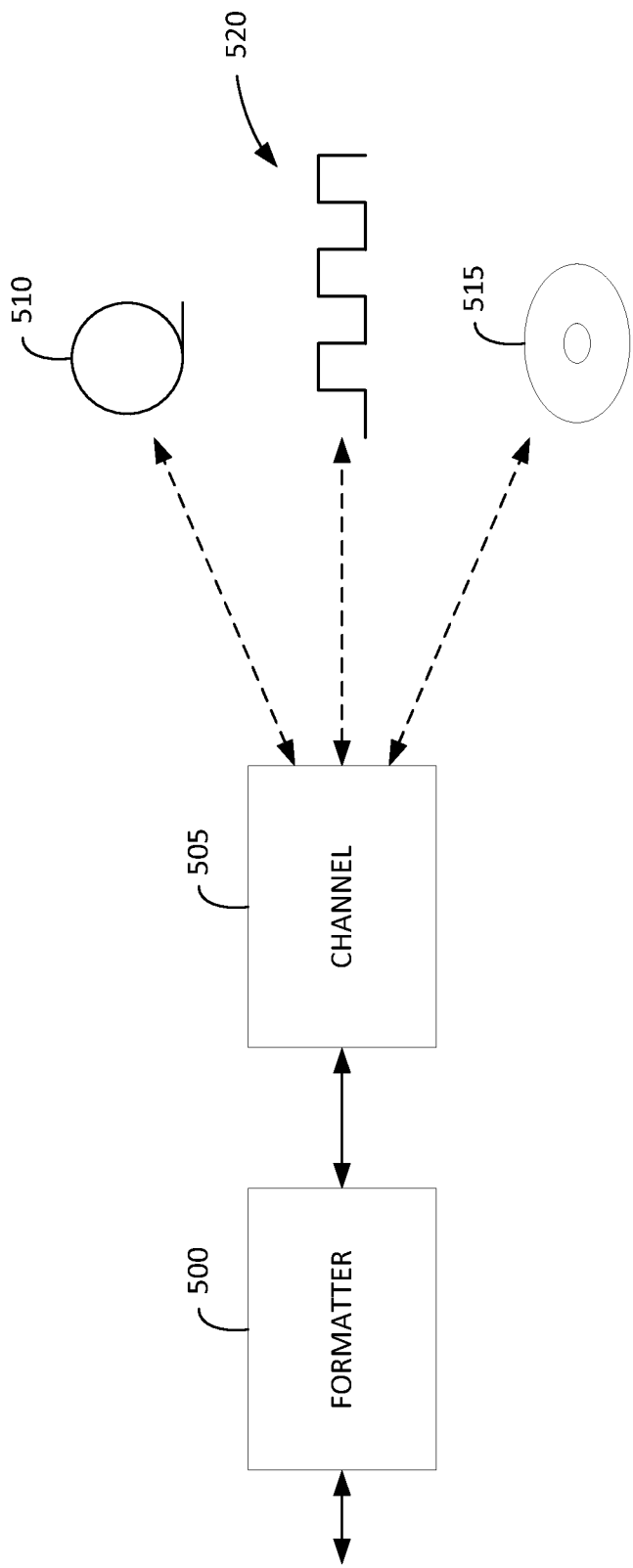
FIG. 5 shows uses of a channel and formatter.

The description above can be used with other types of media, such as non-bit-patterned media, heat assisted magnetic recording media, magneto-optical, tape and optical. As well, the description above can be used with a digital data stream input. To illustrate, FIG. 5 shows a formatter 500 and channel 505 coupled to one of a tape 510, optical 515 and digital input 520.

What is claimed is:

1. A data format comprising:
quiet fields; and
synchronization fields paired with the quiet fields and aligned on boundaries of symbols, each of the symbols occupying a storage area smaller than a sector.

2. The data format of claim 1 wherein each of the synchronization fields has a length equal to an integer multiple of symbol length.

3. The data format of claim 1 wherein the synchronization fields are spaced at intervals that are based on a magnitude and bandwidth of tolerable timing disturbances.

4. The data format of claim 1 further comprising intervals between the synchronization fields, the intervals chosen to ensure an accumulated phase error is within limits for reliable writing.

5. The data format of claim 1 wherein each of the quiet fields is positioned prior to a respective one of the synchronization fields.

6. The data format of claim 5 wherein at least one of the quiet fields has a length greater than at least one of the synchronization fields.

7. The data format of claim 6 wherein at least one of the quiet fields has a length greater than at least one of the synchronization fields by at least one symbol.

8. The data format of claim 5 wherein at least one of the quiet fields is aligned on symbol boundaries.

9. The data format of claim 5 further comprising at least one of a postamble and a preamble associated with at least one of the quiet fields.

10. The data format of claim 1 further comprising at least one of a postamble and a preamble associated with at least one of the synchronization fields.

11. The data format of claim 1 wherein the synchronization fields are P fields.

12. The data format of claim 1 wherein the synchronization fields are radially aligned in a zone.

13. The data format of claim 1 further comprising data sector fragments interspersed with the synchronization fields.

14. The data format of claim 13 further comprising write splices interspersed with the data sector fragments and the synchronization fields, wherein the write splices do not overlap the synchronization fields.

15. A storage medium comprising at least a pair of a synchronization field and a quiet field with a length greater than a length of the synchronization field, the quiet field having a length that is an integer number of symbols, each of the symbols occupying a storage area smaller than a sector.

16. The medium of claim 15 wherein the fields are aligned on symbol boundaries.

17. The medium of claim 15 wherein the length of the synchronization field is an integer multiple of a symbol.

18. The medium of claim 15 further comprising additional synchronization fields, the synchronization field and the additional synchronization fields are spaced at intervals that are based on a magnitude and bandwidth of tolerable timing disturbances.

19. The medium of claim 15 further comprising additional synchronization fields and intervals between the synchronization field and the additional synchronization fields, the intervals chosen to ensure an accumulated phase error is within limits for reliable writing.

20. The bit-patterned medium of claim 15 further comprising a data wedge, a track, or a zone that includes the pair of the synchronization field and the quiet field.

21. The medium of claim 15 wherein the storage medium is a bit patterned medium.

22. The medium of claim 15 wherein the storage medium is a bit patterned medium and a heat assisted magnetic recording medium.

23. The medium of claim 15 further comprising at least one of a postamble and a preamble associated with the synchronization field or the quiet field.

24. The medium of claim 15 further comprising data sector fragments interspersed with the pair of the synchronization field and the quiet field.

* * * * *